United States Patent [19]

Mitsushima et al.

[11] Patent Number: 4,774,525

[45] Date of Patent: Sep. 27, 1988

[54] THERMAL TRANSFER TYPE MULTICOLOR PRINTER

[75] Inventors: Susumu Mitsushima; Junji Kawano; Takeshi Okuno; Kiyoshige Ishiyama, all of Ise, Japan

[73] Assignee: Shinko Electric Co., Ltd., Japan

[21] Appl. No.: 1,038

[22] Filed: Jan. 7, 1987

[30] Foreign Application Priority Data

Jan. 8, 1986 [JP] Japan .................................... 61-1861
Feb. 3, 1986 [JP] Japan ............................ 61-14223[U]
Aug. 21, 1986 [JP] Japan ............................... 61-195897

[51] Int. Cl.[4] ............................................ G01D 15/10
[52] U.S. Cl. ................................ 346/76 PH; 400/120
[58] Field of Search ................. 346/76 R, 76 PH, 1.1; 400/120

[56] References Cited

U.S. PATENT DOCUMENTS 4,551,729 11/1985 Lubo et al. .......................... 346/1.1

FOREIGN PATENT DOCUMENTS 0086661 8/1983 European Pat. Off. ....... 346/76 PH
3438663 5/1985 Fed. Rep. of Germany ... 346/76 PH
0092886 5/1985 Japan ............................. 346/76 PH

*Primary Examiner*—E. A. Goldberg
*Assistant Examiner*—Huan H. Tran
*Attorney, Agent, or Firm*—Darby & Darby

[57] ABSTRACT

A thermal transfer type multicolor printer including: a frame; a sprocket wheel, rotatably mounted to the frame, for feeding a printing paper, having feeding holes, in one of both a forward direction and a reverse direction in a selective manner, the sprocket wheel having sprocket pins mounted thereon adapted to engage feed holes of the printing paper for feeding the printing paper, the feed holes each having a trailing edge, and the sprocket wheel being adapted to rotate at a first foward peripheral speed when the printing paper is fed in the forward direction for printing and at a first reverse peripheral speed when the printing paper is fed in the reverse direction; a platen roller, rotatably mounted on the frame and adapted to rotate at a second forward peripheral speed for feeding the printing paper in the forward direction and at a second reverse peripheral speed for feed the printing paper in the reverse direction; a thermal head for transferring a heat dissolving ink of an ink ribbon, set over the platen roller through the printing paper, to the printing paper, and a rotation mechanism, mounted to the frame, for simultaneously rotating both the platen roller and the sprocket wheel for feeding the printing paper.

5 Claims, 4 Drawing Sheets

THERMAL TRANSFER TYPE MULTICOLOR PRINTER

BACKGROUND OF THE INVENTION

The present invention relates to a thermal transfer type multicolor printer and more specifically to a printing paper feed apparatus of a thermal transfer type multicolor printer, in which a multicolor printing is carried out by the use of a transfer ribbon which carries a plurality of heat-dissolving inks.

One of the inventors has proposed as a joint inventor thermal transfer type multicolor printers in U.S. Pat. No. 4,551,729 entitled METHOD OF MAKING THERMAL TRANSFER TYPE MULTICOLOR PRINTING and issued on Nov. 5, 1985. The disclosure of this patent is incorporated herein by reference. In the prior art printers, a thermal transfer type multicolor printing is xade while both a printing paper and an ink film, placed over the printing paper, are moved between a thermal head and a platen roller which has sprocket pins mounted to it. The ink film has a base film applied with yellow, magenta and cyan inks in turns. After printing of a picture component for a predetermined color, the printing paper is returned to an initial or home position and the ink film is advanced for subsequent printing in another color. Thus, a multicolor printing is performed by superposing inks of three colors. In one of the prior art multicolor printers, the feed of the printing paper is carried out with a platen roller, of which sprocket pins engage with feed holes of the printing paper, and back tension is applied to the printing paper with back tension rollers for preventing color aberration or deviation from predetermined position during both forward and backward feeding.

This prior art multicolor printer has several points to be improved, one of which is that it is rather hard to appropriately adjust peripheral speeds of both the platen roller and the back tension rollers for preventing tearing of peripheries of feed holes, engaging sprocket pins, of the printing paper due to excessive tension in the printing paper.

SUMMARY OF THE INVENTION

Accordingly, it is an object of the present invention to provide a thermal transfer type multicolor printer which removes the above drawback of the prior art.

With this and other objects in view, the present invention provides a thermal transfer type multicolor printer including: a frame; a sprocket wheel, rotatably mounted to the frame, for feeding a printing paper, having feeding holes, in one of both a forward direction and a reverse direction in a selective manner, the sprocket wheel having sprocket pins mounted thereon adapted to engage feed holes of the printing paper for feeding the printing paper, the feed holes each having a trailing edge, and the sprocket wheel being adapted to rotate at a first forward peripheral speed when the printing paper is fed in the forward direction for printing and at a first reverse peripheral speed when the printing paper is fed in the reverse direction; a platen roller, rotatably mounted on the frame and adapted to rotate at a second forward peripheral speed for feeding the printing paper in the forward direction and at a second reverse peripheral speed for feed the printing paper in the reverse direction, the second forward peripheral speed being adapted to be smaller than the first forward peripheral speed so that the printing paper is loosely fed between the sprocket wheel and the platen roller, and the second reverse peripheral speed being adapted to be smaller than the first reverse peripheral speed so that sprocket pins of the sprocket wheel are brought into contact with rtrailing edges of feed holes of the printing paper when the printing paper is fed in the reverse direction; a thermal head for transferring a heat dissolving ink of an ink ribbon, set over the platen roller through the printing paper, to the printing paper, the thermal head adapted to urge against the platen roller during the transferring of the heat dissolving ink and adapted to be away from the platen roller during feeding of the printing paper in the reverse direction; and a rotation mechanism, mounted to the frame, for simultaneously rotating both the platen roller and the sprocket wheel for feeding the printing paper.

The outer diameter of the platen roller may be smaller than the outer diameter of the sprocket wheel and the platen roller and the sprocket wheel may be rotated at an equal angular velocity.

Preferably, the platen roller feeds the printing paper forwards from the platen roller only by friction between the platen roller and the printing paper which is urged against the platen roller by the thermal head. With such a construction, no sprocket pin is mounted to the platen roller. This enables the platen roller to be reduced in both size and cost. According to the prior art, it is difficult to reduce the diameter of the platen roller having sprocket pins within reasonable production cost since provision of sprocket pins to a reduced diameter platen requires the pitch of sprocket pins to be accordingly reduced, which makes fabrication of the platen hard and requires printing paper having off-specification pitch feed holes which engages the sprocket pins.

In a preferred embodiment of the present invention, the sprocket wheel is provided in the number of two for engagement of the sprocket pins with feed holes formed through opposite peripheries of the printing paper, the two sprocket wheels being mounted on a first shaft rotatably supported on the frame. The platen roller comprises a second shaft rotatably supported on the frame, and the rotation mechanism comprises: a stepping motor mounted on the frame and having an output shaft; a drive timing pulley mounted around the output shaft; a first timing pulley mounted around the first shaft; a second timing pulley mounted around the second shaft; and a endless timing belt engaging with the drive timing pulley, the first timing pulley and the second timing pulley for transmitting rotation from the stepping motor to both the sprocket wheel and the platen roller.

In a modified form of the thermal transfer type multicolor printer, the frame comprises a frame body and a pivotal frame member mounted to the frame body for vertical pivotal movement, the pivotal frame member including an outlet opening formed therethrough for discharging a leading porting of the printing paper. Further, the second shaft of the platen roller is rotatably mounted to the pivotal frame member whereby the printing paper and the ink ribbon set over the platen roller are separated from each other when the pivotal frame member is pivoted vertically relative to the frame body. With such a construction, replacement of both the ink ribbon and the printing paper and maintenance of components within the frame are facilitated by placing the pivotal frame to an upwards pivoted position.

Preferably, the stepping motor is mounted to the pivotal frame and the first shaft of the sprocket wheels are rotatably supported on the pivotal frame.

BRIEF DESCRIPTION OF THE DRAWINGS

The invention will now be described by way of example with reference to the accompanying drawings in which.

DETAILED DESCRIPTION OF THE PREFERREED EMBODIMENTS

Figure 1:
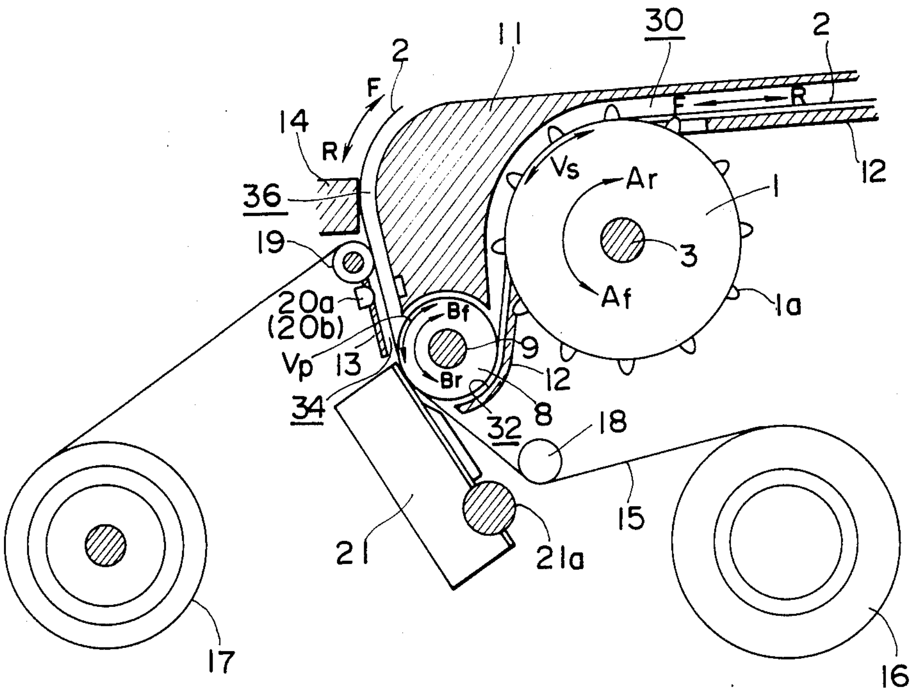
FIG. 1 is a vertical section of essential portions of a thermal transfer type multicolor printer according to the present invention.
Figure 2:
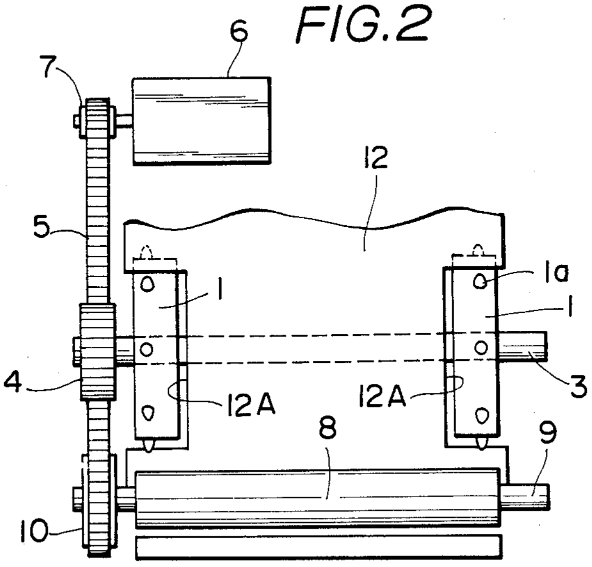
FIG. 2 is a plan view, partly broken away, of the printer in FIG. 2.
Figure 3:
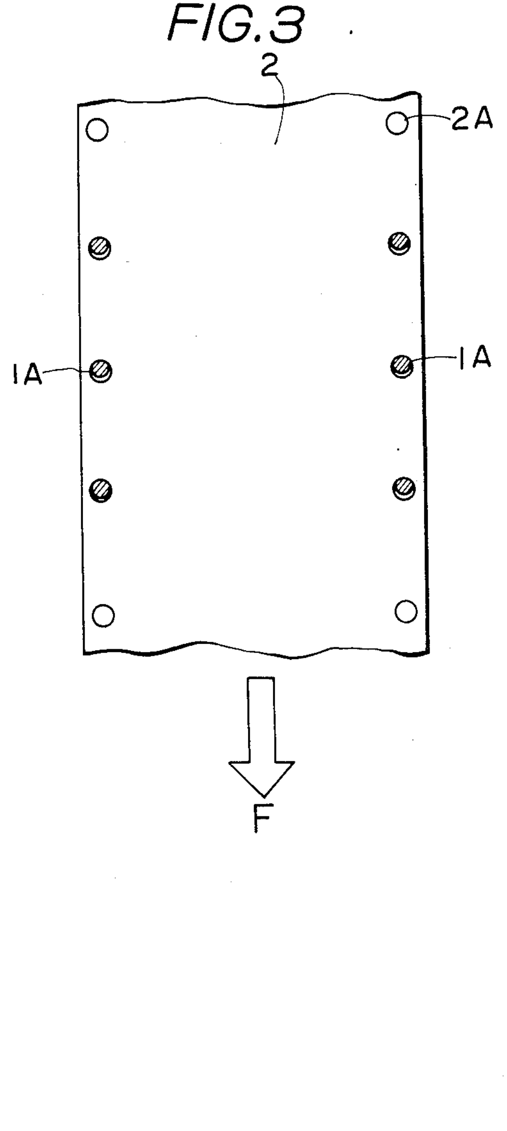
FIG. 3 is a plan view of a printing paper used in the printer in FIG. 1, the printing paper engaging with sprocket pins of the sprocket wheels in FIG. 1.

Referring now to FIGS. 1 to 3, the thermal transfer type multicolor printer is provided with a pair of sprocket wheels 1 and 1 of which sprocket pins 1A are designed to fit into feed holes 2A of a printing paper 2. The two sprocket wheels 1 and 1 are mounted to opposite end portions of a shaft 3, which is rotatably supported on a frame not shown. Mounted to one end of the shaft 3 is a sprocket wheel driving timing pulley 4, which meshes with an endless timing belt 5 at the outer face of the latter. The timing belt 5 has teeth formed on the opposite faces thereof and extends around both a drive timing pulley 7 and a platen roller driving timing pulley 10. The drive timing pulley 7 is mounted around an output shaft of a stepping motor 6 and the platen roller driving timing pulley 10 is mounted to a shaft 9 of a platen roller 8. The stepping motor 6 is fastened to the frame and the platen roller shaft 9 is rotatably supported on the frame in parallel with the shaft 3 of the sprocket wheels 1 and 1. The sprocket wheel driving timing pulley 4 engages with the timing belt 5 at a substantially central position between the drive timing pulley 7 and the platen roller driving timing pulley 10. Thus, rotation of the stepping motor 6 causes both the sprocket wheels 1 and the platen roller 8 to be rotated simultaneously and in directions reverse to each other.

The peripheral speed Vp of the platen roller 8 at the outer periphery thereof is set to be slightly smaller than the peripheral speed Vs of the sprocket wheels 1 at the outer periphery of the latter in both the forward and reverse feeds of the printing paper. That is, the outer diameter D1 of the platen roller 8 is defined by the formula:

$$D1 = D2 - \Delta D$$

where D2 is a hypothetical outer diameter of the platen roller 8 when both the platen roller 8 and the sprocket wheel 1 are equal in peripheral speed and ΔD is a small amount. In forward feed of the printing paper, the peripheral speeds Vs and Vp are designed so that a loosened portion of the printing paper between the sprocket wheel 1 and the platen roller 8 may not be rolled and folded by the platen roller 8 due to excess loosening of that portion. Typically, D1 is designed so that the peripheral speed Vp of the platen roller 8 is about 0.990 to 0.992 times as large as the peripheral speed Vs of the sprocket wheels 1 and 1.

A first paper guide 11 is disposed above the sprocket wheels 1 and 1 and platen roller 8 with a small clearance. A second paper guide 12 is disposed below the first paper guide 11 to form a first printing paper passage 30. The second paper guide 12 has a pair of rectangular cutouts 12A and 12A at opposite lateral peripheries thereof and is bent downwards at the cutout portion. Each of the sprocket wheels 1 and 1 partly projects from a corresponding cutout 12A as clearly shown in FIG. 1. The front portion or the lower end portion of the second paper guide 12 is bent horizontally forwards to define a second printing paper passage 32 between that front portion and the platen roller 8. A third paper guide 13 is arranged upstream of the platen roller 8 so that a third paper passage 34 is defined between the first and the third paper guides 11 and 13. An ink film separating roller 19 is arranged adjacent to the third paper guide 13. Disposed downwards of the ink film separating roller 19 is a fourth printing paper guide 14 which defines a fourth printing paper passage 36 between the first paper guide 11 and it. Thus, a printing paper 2 from a printing paper roll (not shown) passes through the first, second, third and fourth paper passages 30, 32, 34 and 36 to the outside o the printer. The printing paper 2 extends partly around both the sprocket wheel 1 and the platen roller 8.

An ink film 15 is placed over the printing paper 2 at a printing position on the platen roller 8. The ink film 15 carries three kinds of heat dissolving color inks, i.e., yellow, magenta and cyan inks, sequentially applied over it and is supplied from an ink film supply reel 16. The ink film 15 is guided by a guide roller 18, passes the printing position, is separated from the printing paper 2 by the ink film separating roller 19 and is then wound around an ink film winding reel 17 which is rotated by a winding motor, not shown, for winding the ink film 15.

The third paper guide 13 has a pair of photo sensors 20*a* and 20*b* (only one of which is shown) mounted to it at the same level for detecting film marks (not shown) which are provided on the ink film 15 for indicating respective inks.

A thermal head 21 is arranged for pivotal movement about its shaft 21*a*, which is parallel to the shaft 9 of the platen 8, and hence its head is movable towards and away from the platen roller 8. The thermal head 21 is brought into abutment with the platen roller 8 at the printing position through both the ink film 15 and the printing paper 2 by actuating a solenoid, not shown, against a spring (not shown either) and is separated from it by the force of the spring with the solenoid deactivated.

In this embodiment, multicolor printing is carried out in a conventional manner. First of all, both a leading portion of the printing paper 2 and an ink zone of a predetermined color, for example, yellow of the ink film 15 are placed over the platen roller 8 for initial positioning. In this operation, the printing paper 2 is pulled forwards and thus, sprockets pins 1*a* are brought into contact with the trailing edges of the feed holes 2A of the printing paper 2.

Then, the thermal head 21 is brought into abutment with the platen roller 8 and the motor 6 is energized to rotate both the sprocket wheel 1 and the platen roller 8 in forward directions Af and Bf respectively, so that the printing paper 2 and the ink film 15 are fed in the forward direction F, during which a yellow component of a picture to be reproduced is conventionally printed in yellow on the printing paper 2. The sprocket wheels 1 and 1 and the platen roller 8 are rotated in directions reverse to each other.

After the yellow printing, the thermal head 21 is swung away from the platen roller 8 and then, the motor 6 is reversed, so that the sprocket wheels 1 and 1 and the platen roller 8 are rotated in reverse directions Ar and Br, respectively, for returning the printing paper 2 to the initial position. During this operation, the ink film 15 is moved to position the next magenta zone at the printing position.

When the printing paper 2 is returned to the initial position, the thermal head 21 is urged against the platen roller 8 to perform magenta printing in the same manner as the yellow printing. After the magenta printing, the same procedures are repeated for making cyan printing as in the yellow printing, thus multicolor printing being completed.

When the printing paper 2 is fed in the forward direction F by the frictional force of the platen roller 8 and by engagement with the sprocket wheel 1, the platen roller 8 is slightly smaller in paper feeding speed or peripheral speed than the sprocket wheel 1. Thus, the tightening of the printing paper 2 between the platen roller 8 and the sprocket wheel 1 becomes slightly loose, so that tearing of the peripheries of feed holes 2A of the printing paper 2 by sprocket pins 1a due to excess tightening is hence prevented.

In reverse feeding of the printing paper 2, both the sprocket wheel 1 and the platen roller 8 are reversed. During this operation, the thermal head 21 is away from the platen roller 8, so that the printing paper 2 is provided with no grip between the thermal head 21 and the platen roller 8. The loosened portion of the printing paper 2 between the sprocket wheel 1 and the platen roller 8 becomes tight again since in reverse feeding, the peripheral speed Vs of the sprocket wheel 1 is slightly larger than the peripheral speed Vp of the platen roller 8. Friction is produced between the printing paper 2 and the platen roller 8 and hence appropriate breaking force is applied to the printing paper 2, so that sprocket pins 1a are brought into abutment against trailing edges of the feed holes 2A of the printing paper 2 as illustrated in FIG. 3. In this manner, the printing paper 2 is returned exactly to the initial position.

In the home feed of the printing paper 2, the thermal head 21 is moved away from the platen roller 8 and the printing paper 2 is hence fed in the forward direction F mainly by the sprocket wheel 1 and the platen roller 8 provides an auxiliary feed to the printing paper 2.

A modified form of the thermal printer in FIGS. 1 and 2 is illustrated in FIGS. 4 to 7, in which like reference characters designate corresponding parts of the preceding embodiment and description thereof is omitted. This modification is generally distinct from the printer in FIGS. 1 and 2 in that the sprocket wheels 1 and 1, the platen roller 8 and the stepping motor 6 are mounted on a pivotal frame member 56.

Figure 4:
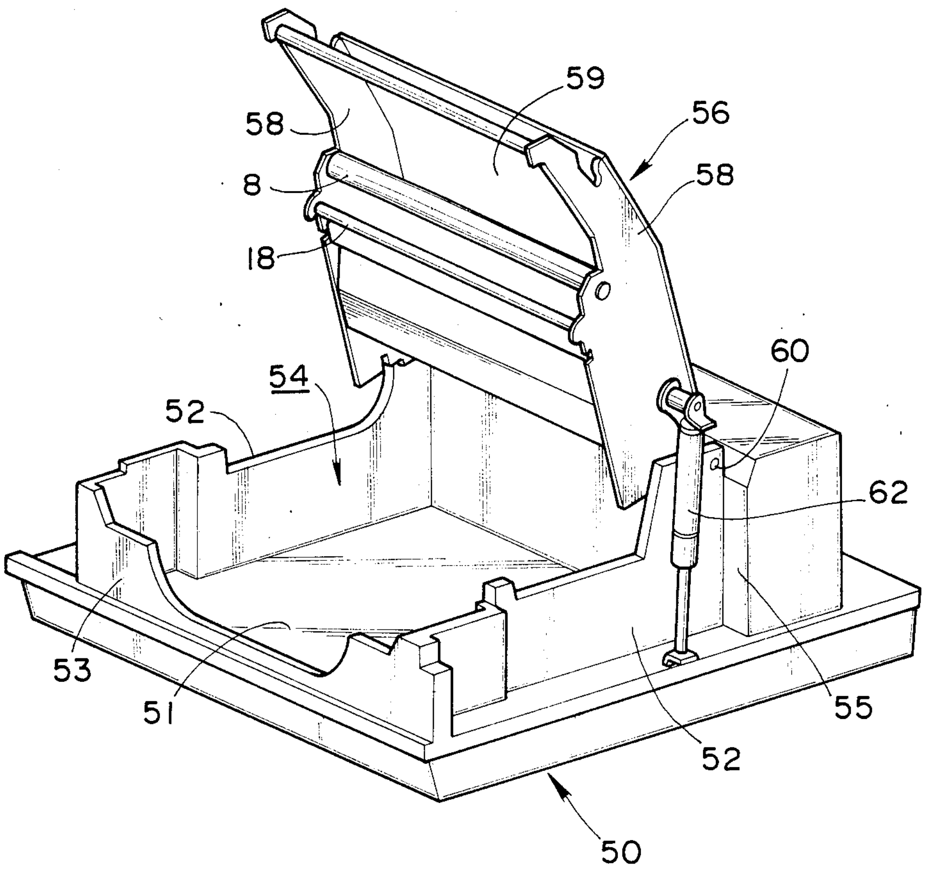
FIG. 4 is a perspective view of a modified form of the thermal transfer type multicolor printer in FIG. 1, only essential components thereof being illustrated.

As shown in FIG. 4, the frame includes a frame body 50 and the pivotal frame member 56. The frame body 50 includes a base plate 51, a pair of parallel side walls and 52, a front wall 53 and a rear wall 55. These walls 52, 52, 53 and 55 are integrally formed with the base plate 51, defining a components receiving recess 54 although components of the printer received in that recess are not shown in FIG. 4 for illustration purpose. The pivotal frame member 56 includes a pair of parallel side walls 58 and 58 and a cover plate member 59 interconnecting the two side walls 58 and 58 to be perpendicular to the plate member 59. The side walls 58 and 58 of the pivotal frame 56 are pivoted at their distal ends to respective side walls 52 and 52 through pins 60 and 60 for vertical pivotal movement about the pins.

Figure 5:
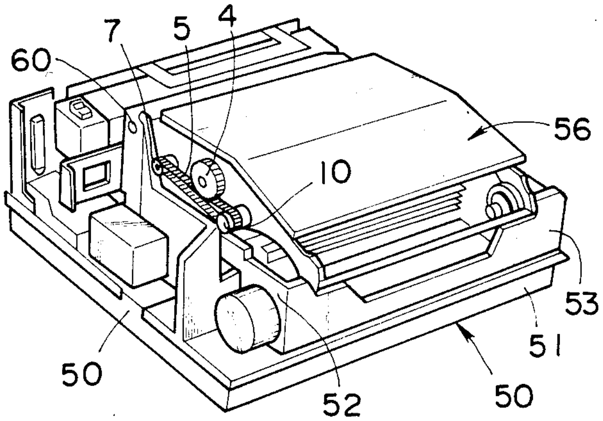
FIG. 5 is a perspective view, in a modified scale, of the printer in FIG. 4.

The cover plate member 59 has a printing paper inlet passage 59B, formed substantially vertically through its central portion, and a printing paper outlet passage 59A forxed substantially vertically through it in front of the inlet passage 59B. The wall which is located behind the outlet passage 59A constitutes a printing paper guide wall 70. The shafts of the sprocket wheels 1 and 1 and the platen roller 8 are rotatably supported at their opposite ends on the side walls 58 and 58. The guide wall 70 has a sprocket wheel opening 70A and the sprocket wheel 1 partly projects from the guide wall 70 through the opening 70A. The stepping motor 6 is mounted to the inner face of one side wall 58 of the pivotal frame member 56. The sprocket wheel driving timing pulley 4, the drive timing pulley 7, the platen roller driving timing pulley 10 and the timing belt 4 are, as shown in FIG. 5, arranged to the outer face of the one side wall 58 of the pivotal frame member 56. The printing paper 2 is supplied from a printing paper roll 64 rotatably supported on a bearing 66 mounted to the frame body 50 and passes over the guide wall 70 to the sprocket wheel 1 for engagement. Then, the printing paper 2 passes through the inlet opening 59B, engages with the platen roller 8 and finally passes through the outlet opening 59A. The ink film guide roller 18 is rotatably supported also on the side walls 58 and 58 of the pivotal frame member 56.

Figure 6:
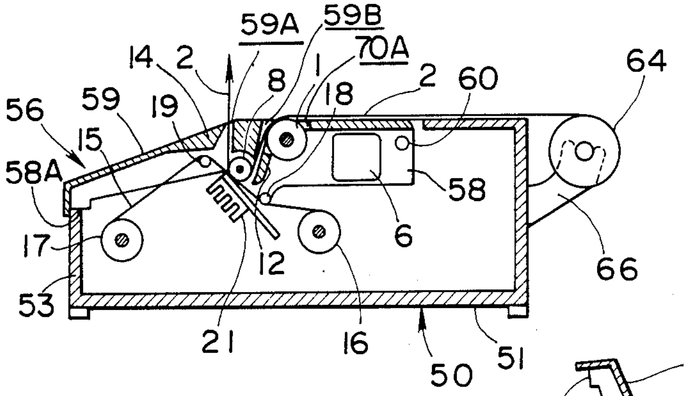
FIG. 6 is a diagrammatic vertical section of the printer in FIG. 5, only essential components thereof being illustrated.
Figure 7:
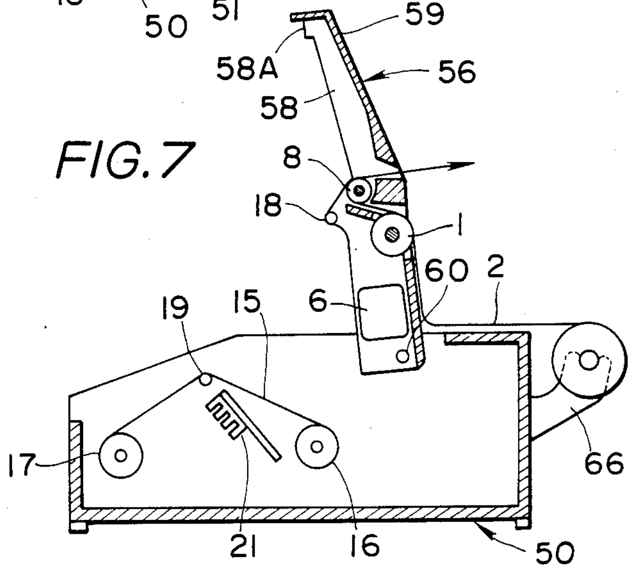
FIG. 7 is a diagrammataic view of the printer in FIG. 6 when the pivotal frame is swung to an upper end position.

When the pivotal frame member 56 is, as illustrated in FIGS. 5 and 6, in an operative position, the free ends of the side walls 58 and 58 thereof are in abutment with the upper edge of the front wall 53 and the pivotal frame 56 is releasably locked in this position by a conventional locking mechanism (not shown). In this operative position, the ink film 15 is in contact with the guide roller 18 and with the printing paper 2 at the platen roller 8. When the locking mechanism is released, the pivotal frame member 56 is swung upwards to an upwards pivoted position, illustrated in FIGS. 4 and 7, by a conventional gas stay or gas spring 62, the lower end of which is mounted on the base plate 51 and the upper end of which is rotatably connected to the other side wall 58 of the pivotal frame member 56. In the pivoted position, the printing paper 2 and the ink film 15 are separated from each other for facilitating replacement of the ink film 15 and/or the printing paper 2 or maintenance of components within the frame.

What is claimed is:

1. A thermal transfer type multicolor printer comprising:

a frame;

a sprocket wheel, rotatably mounted to the frame, for feeding a printing paper, having feeding holes, in one of both a forward direction and a reverse direction in a selective manner, the sprocket wheel having sprocket pins mounted thereon adapted to engage feed holes of the printing paper for feeding the printing paper, the feed holes each having a trailing edge, and the sprocket wheel being adapted to rotate at a first forward peripheral speed when the printing paper is fed in the forward direction for printing and at a first reverse peripheral speed when the printing paper is fed in the reverse direction;

a platen roller, free of sprocket pins for engaging the feed holes of the printing paper for feeding, rotatably mounted on the frame and adapted to rotate at a second forward peripheral speed for feeding the printing paper in the forward direction and at a second reverse peripheral speed for feeding the printing paper in the reverse direction, the second forward peripheral speed being adapted to be smaller than the first forward peripheral speed so that the printing paper is loosely fed between the sprocket wheel and the platen roller, and the second reverse peripheral speed being adapted to be smaller than the first reverse peripheral speed, the platen roller being arranged to provide a breaking force to the printing paper when the paper is fed in the reverse direction, whereby the sprocket pins are brought into abutment against trailing edges of the feeding holes;

a thermal head, adapted to urge against the platen roller, for transferring a heat dissolving ink of an ink ribbon, set over the platen roller through the printing paper, to the printing paper when the paper is fed in the forward direction, and the thermal head being adapted to separate form the platen roller when the printing paper is fed in the reverse direction;

rotation means, mounteed to the frame, for simultaneously rotating both the platen roller and the sprocket wheel for feeding the printing paper; and thermal head moving means, mounted to the frame, for selectively moving the thermal head towards the platen roller when the printing paper is fed in the forward direction and away from the platen roller when the printing paper is fed in the reverse direction; and wherein the platen roller feeds the printing paper in the forward direction only by friction between the platen roller and the printing paper urged against the platen roller by the thermal head.

2. A thermal transfer type multicolor printer as recited in claim 1, wherein the outer diameter of the platen roller is smaller than the outer diameter of the sprocket wheel and wherein the platen roller and the sprocket wheel are rotated at an equal angular velocity.

3. A thermal transfer type multicolor printer as recited in claim 2, wherein the sprocket wheel is provided in the number of two for engagement of the sprocket pins with feed holes formed through opposite peripheries of the printing paper, the two sprocket wheels being mounted on a first shaft rotatably supported on the frame, wherein the platen roller comprises a second shaft rotatably supported on the frame, and wherein the rotation means comprises: a stepping motor mounted on the frame and having an output shaft; a drive timing pulley mounted around the output shaft; a first timing pulley mounted around the first shaft; a second timing pulley mounted around the second shaft; and a endless timing belt engaging with the drive timing pulley, the first timing pulley and the second timing pulley for transmitting rotation from the stepping motor to both the sprocket wheel and the platen roller.

4. A thermal transfer type multicolor printer as recited in claim 3, wherein the frame comprises a frame body and a pivotal frame member mounted to the frame body for vertical pivotal movement, the pivotal frame member including an outlet opening formed therethrough for discharging a leading porting of the printing paper, and wherein the second shaft of the platen roller is rotatably mounted to the pivotal frame member whereby the printing paper and the ink ribbon set over the platen roller are separated from each other when the pivotal frame member is pivoted vertically relative to the frame body.

5. A thermal transfer type multicolor printer as receited in claim 4, wherein the stepping motor is mounted to the pivotal frame and the first shaft of the sprocket wheels are rotatanbly supported on the pivotal frame.

* * * * *